United States Patent [19]

Galloway

[11] Patent Number: 4,814,257

[45] Date of Patent: Mar. 21, 1989

[54] OPTICAL COATING COMPOSITION

[75] Inventor: Lory Galloway, Wilmington, Del.

[73] Assignee: E. I. Du Pont de Nemours and Company, Wilmington, Del.

[21] Appl. No.: 36,191

[22] Filed: Apr. 9, 1987

Related U.S. Application Data

[63] Continuation of Ser. No. 760,947, Jul. 31, 1985, abandoned.

[51] Int. Cl.$^4$ .................. G03C 1/94; G03C 1/72
[52] U.S. Cl. .................. 430/278; 430/271; 430/945; 430/273; 430/961; 430/935; 430/533; 430/536; 430/944; 427/160
[58] Field of Search ............. 430/271, 945, 273, 278, 430/961, 935, 533, 536, 944; 427/160, 760, 947

[56] References Cited

U.S. PATENT DOCUMENTS

| | | | |
|---|---|---|---|
| 3,314,073 | 4/1967 | Becker | 346/76 |
| 3,474,457 | 10/1969 | Becker | 346/76 |
| 3,665,483 | 5/1972 | Becker et al. | 346/1 |
| 3,911,444 | 10/1973 | Lou et al. | 346/1 |
| 4,188,433 | 2/1980 | Dijkstra et al. | 428/64 |
| 4,270,132 | 5/1981 | Bell | 346/135.1 |
| 4,300,143 | 10/1981 | Bell et al. | 346/135.1 |
| 4,305,081 | 12/1981 | Spong | 346/135.1 |
| 4,477,328 | 10/1984 | Broeksema et al. | 204/159.23 |
| 4,492,718 | 1/1985 | Mayer et al. | 427/160 |
| 4,514,468 | 4/1985 | Lucey | 427/54.1 |
| 4,581,317 | 4/1986 | Simmons | 430/270 |

FOREIGN PATENT DOCUMENTS 85-1227 3/1985 PCT Int'l Appl. ............. 430/945

OTHER PUBLICATIONS

A. E. Bell, *Computer Design*, Jan. 1983, pp. 133–146.
Bell & Spong, IEEE Journal of Quantum Electronics, vol. QE-14, 78, pp. 487–495.

*Primary Examiner*—Paul R. Michl
*Assistant Examiner*—Cynthia Hamilton

[57] ABSTRACT

An optical coating composition comprising a liquid monofunctional photohardenable acrylic ester monomer having dissolved therein an oligomer having a molecular weight of at least 500 and a photoinitiator system.

9 Claims, No Drawings

OPTICAL COATING COMPOSITION

This application is a continuation of application Ser. No. 760,947, filed July 31, 1985, now abandoned.

FIELD OF INVENTION

The invention relates to a composition for forming optical layers particularly for use in the manufacture of optical recording media.

BACKGROUND OF THE INVENTION

In response to the demand for more reliable and higher capacity data storage and retrieval systems, there is considerable activity in the research and development of so-called optical disk recording systems. These systems utilize a highly focused modulated beam of light, such as a laser beam, which is directed onto a recording layer which is capable of absorbing a substantial amount of the light. The heat thusly produced causes the light-absorbing material in the areas struck by the highly focused laser beam to change chemically and/or physically, thus producing a concomitant change in optical properties, e.g., transmissivity or reflectivity, in the affected area. For readout, the contrast between the amount of light transmitted or reflected from the unaffected parts of the absorbing layer and from the marked areas of the layer is measured. Examples of such recording systems are disclosed throughout the literature and in numerous U.S. Patents such as U.S. Pat. Nos. 3,314,073 and 3,474,457. In recording data, a rotating disk having a light-absorptive recording layer is exposed to modulated radiation from a laser source. This radiation is passed througH a modulator and appropriate optics, and the highly focused laser beam is directed onto the disk which forms by chemical and/or physical reaction of the light-absorbing layer a series of very small marks along a circular path within the light-absorptive layer. The frequency of the marks is determined by the modulator inputs. Using laser beams with a focused spot diameter of 1 $\mu$m or less, data can be stored at a density of $10^8$ bits/cm$^2$ or higher.

The simplest optical disk medium consists merely of a dimensionally stable solid substrate on which is coated a thin layer of light-absorptive material such as a metal layer. When the light-absorptive layer is struck by an intense beam of coherent light, such as from a laser source, the light-absorptive material is either vaporized and/or thermally degraded, thereby producing a very small marked area which exhibits different transmissivity or reflectivity than the adjacent unmarked layer. Multilayer antireflection structures, such as those disclosed in U.S. Pat. No. 4,305,081 to Spong and U.S. Pat. No. 4,270,132 to Bell, increase the absorption of the laser beam which also gives better read/write contrast than with the use of simple single layer media. Therefore, for purposes of obtaining better power efficiency, sensitivity and readout response of the record, it has been preferred to use multilayer antireflective structures.

There are two basic types of multilayer antireflective structures, one of which is basically a bilayer structure and the other a trilayer structure. In bilayer media, the substance is coated with a very smooth, highly reflective material such as aluminum, on top of which is coated a layer of moderately light-absorptive material which is preferbly of a thickness corresponding to about $\lambda/4n$, where $\lambda$ is the wavelength of the recording light source and n is the refractive index of the light-absorptive layer. In trilayer media, the substrate is likewise coated with a first layer of very smooth highly reflective material on which is coated a second layer of transparent material. Atop the transparent second layer is coated a thin third layer of strongly light-absorptive material. The combined thickness of the transparent and absorptive layers is preferably adjusted to be about $\lambda/4n$. In both types of structures, the adjustment of certain layer thicknesses according to the wavelength of light and refractive index of the layer is for the purpose of minimizing the amount of light reflected from the unmarked areas and maximizing the amount of light reflected from the marked areas, thus producing a higher playback signal amplitude. A detailed discussion of the three types of disk construction is given by A. E. Bell in *Computer Design*, January 1983, pp. 133–146 and the references cited therein. See especially Bell and Spong, *IEEE Journal of Quantum Electronics*, Vol. QE-14, 1978, pp. 487–495.

It will be realized, of course, that the terms "bilayer" and "trilayer" refer only to the fundamental optical layers and do not exclude the use of ancillary layers. In particular, it is essential in most instances to have a polymeric layer which seves two important functions: (1) the layer must be optically smooth in order to provide an optically suitable foundation for the overlying reflective layer; and (2) the layer must have good adhesion to the underlying substrate as well as the overlying reflective layer. Furthermore, these properties must persist under all the environmental conditions which may exist as the medium is used and stored.

PRIOR ART

U.S. Pat. No. 4,188,433, Dijkstra et al.

Dijkstra et al. disclose a laser beam recording medium in which the energy absorbing recording layer is protected by a cured layer of UV-curable lacquer which serves as an adhesive layer and an overlying layer of transparent resin. The lacquer is preferably a mixture of protic acrylic acid esters such as hydroxyalkyl or aminoalkyl acrylates. The overlying resin layer can be made of any of several transparent resins, including poly(methyl methacrylate).

U.S. Pat. No. 3,665,483, Becker et al.

This patent is directed to a laser beam recording medium in which the energy-absorbing recording layer is protected with an overlying transparent layer of $SiO_2$. It is disclosed that if the $SiO_2$ is thick enough, it can displace surface dust and dirt from the focal plane of the laser beam.

U.S. Pat. No. 3,911,444, Lou et al.

The Lou et al. patent is directed to a laser beam recording medium in which the energy-absorbing recording layer is coated upon an underlying layer of poly(alkyl methacrylate) or fluorinated polyethylene.

U.S. Pat. No. 4,300,143, Bell et al.

The Bell et al. patent is directed to an optical recording medium in which the recording layer is protected by an adjoining transparent layer of organic or inorganic material.

U.S. Pat. No. 4,477,328, Broeksema et al.

This patent discloses a liquid coating for use on optical recording disks comprising a solution of acrylate or methacrylate oligomers and photoinitiator having a viscosity of 1000–15000 cP. Preferred oligomers are indicated to have a molecular weight of 300–1000. Only alkylene-bis(phenoxy alkylacrylate) and alkylene-bis(phenoxy alkylmethacrylate) are disclosed.
U.S. Pat. 4,492,718, Mayer et al.

The Mayer patent discloses a rotation coating of optical disk substrates with compositions containing acrylate prepolymers, a mixture of triacrylate monomer, monoacrylate monomer, surfactant and initiator. One composition is disclosed which contains only a high molecular weight acrylate oligomer, 2-ethylhexyl acrylate, surfactant and initiator. No compositions are disclosed which use oligomers having molecular weights below 1000.

BRIEF DESCRIPTION OF THE INVENTION

In a primary aspect, the invention is directed to an optical coating composition comprising a solution of:
a. liquid monofunctional photohardenable acrylic ester monomer having no less than 4 carbon atoms in the ester group and having dissolved therein
b. oligomer having a molecular weight of at least 500; and
c. 0.05–10% wt. photoinitiator system, the liquid uncured solution having a viscosity of at least 10 cP and surface tension of less than 36 dynes/cm at coating temperature and the solid cured composition having a transmissivity of at least 88% to light having a wavelength of 488–830 nm and a pencil hardness of at least 2B.

In a second aspect, the invention is directed to
(1) applying to the substrate a liquid layer of the above-described coating composition at a temperature such that the viscosity of the composition is at least 10 cP; and
(2) exposing the coated layer to actinic radiation for a time sufficient to effect substantially complete photohardening of the acrylic monomer.

In a third aspect, the invention is directed to an optical recording medium comprising:
a. a dimensionally stable substrate;
b. a layer of light-absorptive material; and
c. an optical layer coated on layer b. by the method described above.

DETAILED DESCRIPTION OF THE INVENTION

A. Photohardenable Monomer

Only a very narrow class of acrylic ester (acrylate) monomers is suitable as the primary monomer for use in the coating composition of the invention. In particular, the primary monomer must meet each of the following four criteria:
(1) No less than 4 carbon atoms in the ester group;
(2) Mutual solubility with the oligomer;
(3) Liquidity at room temperature;
(4) Monofunctionality.

If the acrylate monomer contains less than 4 carbon atoms in the ester group, the coating tends to shrink excessively upon curing and adhesion is degraded. It is preferred that the ester group contain no more than 20 branched carbon atoms or no more than 10 linear carbon atoms since monomers with ester groups having branched or linear carbon atoms which exceed these values tend to produce compositions which are too soft and waxy. Aromatic acrylate monomers occasionally exhibit incompatibility with the other components. Therefore, only those which are mutually soluble with the other components of the composition can be used in the invention. It will, of course, be apparent that the composition of the invention must be compatible because of their intended use as optical layers. With respect to the monomer composition, reference to the length of the carbon chain means the number of consecutive carbon atoms in the ester group (R″) as follows:

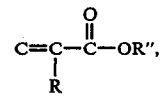

wherein R′=H or $CH_3$ and —OR″ is the ester group.

Because the composition of the invention contains no volatile solvents and because the acrylate monomer also serves as the dispersion medium for the oligomer and the photoinitiation system and since the composition must be liqid at whatever temperature it is coated and preferably at room temperature, the monomer must also be liquid at ambient room temperature.

Of particular interest is the fact that the primary acrylate monomers of the invention must be monofunctional. Multifunctional acrylates are not suitable except in very small amounts for the reason that the photohardened monomers incur excessive shrinkage and thus degrade adhesion. Despite their unsuitability as primary monomers, multifunctional acrylate monomers and solid monofunctional acrylate monomers can be used in quantities up to about 10% wt. of the total monomer content so long as they meet the other criteria listed above. It is, however, preferred to use not more than about 5% wt. In some instances it may be desirable to use limited amounts of certain multifunctional acrylates in order to enhance secondary properties such as hardness and water resistance.

Suitable primary monofunctional acrylate monomers include the following:

| Monomer | Abbreviations |
|---|---|
| isobornyl acrylate | iBA |
| isobornyl methacrylate | iBMA |
| cyclohexyl acrylate | CHA |
| cyclohexyl methacrylate | CHMA |
| isodecyl acrylate | iDA |
| n-decyl acrylate | nDA |
| dicyclopentenyl acrylate | DCPA |
| dicyclopentenyloxyethyl acrylate | DCPOEA |
| 2-ethylbutyl acrylate | 2-EBA |
| 2-ethylhexyl acrylate | 2-EHA |
| glycidyl acrylate | GA |
| n-hexyl acrylate | nHA |
| n-heptyl acrylate | nHEPA |
| n-lauryl acrylate | nLA |
| n-lauryl methacrylate | nLMA |
| 2-octyl acrylate | 2-OA |
| isooctyl acrylate | iOA |
| octadecyl acrylate | ODA |
| octadecyl methacrylate | ODMA |
| phenyl acrylate | PA |
| 2-phenylethyl acrylate | PEA |
| tetrahydrofurfuryl acrylate | THFA |
| 3,5,5-trimethylhexyl acrylate | TMHA |

Other examples of suitable hydrocarbon monofunctional photohardenable acrylic monomers include the following cycloaliphatic acrylates in which the ring positions are substituted with one or more hydrogen or $C_{1-4}$ alkyl groups:
cyclopentyl acrylates
cyclohexyl acrylates
cycloheptyl acrylates cycloheptenyl acrylates
cyclooctyl acrylates
cyclooctenyl acrylates
cyclononenyl acrylates
cyclodecyl acrylates
dicyclopentenyl acrylates
dicyclopentenyloxoethyl acrylates
dicyclopentenyloxoixopropyl acrylates
dicyclopentenyloxopropyl acrylates
dicyclopentenyloxoisobutyl acrylates
dicyclopentenyloxotertiarybutyl acrylates
2-hydroxyalkyl-5-norbornene acrylates.

B. Oligomer

The oligomer component of the composition is needed to adjust the physical properties of the composition. In particular, it is a means for adjusting the viscosity of the coating composition and to adjust the hardness and other physical properites of the photohardened layer. Thus, so long as the oligomer is completely soluble in the acrylic monomer, its chemical composition is not narrowly critical. Thus, polyacrylates, epoxy resins, polyurethanes, aminoplast resins and phenolic resins can all be used as the oligomer component of the compositions of the invention.

When acrylate oligomers are used, they may be either monofunctional or polyfunctional. thus they can be oligomers of any of the above-described monofunctional acrylate monomers or they can be oligomers of acrylate monomers which do not meet the above-described five criteria. For example, monomers that do not meet those criteria are:

1,4-butanediol dimethacrylate
1,6-hexanediol diacrylate
1,6-hexanediol dimethacrylate
methyl acrylate
neopentylglycol dimethacrylate
polyethyleneglycol dimethacrylate
1,4-butanediol diacrylate
ethoxyethoxyethyl acrylate
2-hydroxyethyl acrylate
methyl methacrylate
2-methoxyethyl acrylate
pentaerythritol triacrylate
triethyleneglycol diacrylate
triethyleneglycol dimethacrylate
tetaraethyleneglycol diacrylate
trimethylolpropane triacrylate
tripropyleneglycol diacrylate
1,5-pentanediol diacrylate
ethylene glycol diacrylate
diethylene glycol diacrylate
1,3-propanediol diacrylate
decamethylene glycol diacrylate
decamethylene glycol dimethacrylate
1,4-cyclohexanediol diacrylate
2,2-dimethylol propane diacrylate
glycerol diacrylate
2,2-di(p-hydroxyphenyl)-propane diacrylate
pentaerythritol tetraacrylate
2,2-di(p-hydroxyphenyl)-propane dimethacrylate,
polyoxyethyl-2,2-di(p-hydroxyphenyl)-propane dimethacrylate
di-(3-methacryloxy-2-hydroxypropyl) ether of bisphenol-A
di-(2-methacryloxyethyl) ether of bisphenol-A
di-(3-acryloxy-2-hydroxypropyl) ether of bisphenol-A
di-(2-acryloxyethyl) ether of bisphenol-A
di-(3-methacryloxy-2-hydroxypropyl) ether of tetrachloro-bisphenol-A
di-(2-methacryloxyethyl) ether of tetrachloro-bisphenol-A
di-(3-methacryloxy-2-hydroxypropyl) ether of tetrabromo-bisphenol-A
di-(2-methacryloxyethyl) ether of tetrabromo-bisphenol-A,
di-(3-methacryloxy-2-hydroxypropyl) ether of 1,4-butanediol
di-(3-methacryloxy-2-hydroxypropyl) ether of diphenolic acid
polyoxypropyltrimethylol propane triacrylate (462)
ethylene glycol dimethacrylate
1,3-propanediol dimethacrylate
1,2,4-butanetriol trimethacrylate
2,2,4-trimethyl-1,3-pentanediol dimethacrylate
1-phenyl ethylene-1,2-dimethacrylate
pentaerythritol tetramethacrylate
trimethylol propane trimethacrylate and
1,5-pentanediol dimethacrylate.

A wide variety of liquid cross-linking resins can be used as the oligomeric component for the invention, including thermosetting resins such as aminoplast resins, phenolic resins, blocked polyisocyanates, masked isocyanates, and epoxy resins.

The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine. 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glycols and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. The preferred aminoplast resins are substantially etherified with methanol or butanol.

The phenolic resins which may be used herein are formed by the condensation of an aldehyde and a phenol. The most used aldehyde is formaldehyde, although other aldehydes, such as acetaldehyde, can also be employed. Methylene-releasing and aldehyde-releasing agents such as paraformaldehyde and hexamethylene tetramine, can be utilized as the aldehyde agent if desired. Various phenols can be used; for instance, the phenol employed can be phenol itself, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenyl-phenol, p-tert-butyl-phenol, p-tert-amylphenol, cyclopentyl-phenol and unsaturated hydrocarbon-substituted phenols, such as the monobutenyl phenols containing a butenyl group in ortho, meta or para position, and where the double bond occurs in various positions in the hydrocarbon chain. A common phenol resin is phenol formaldehyde.

Particularly preferred types of phenolic resins are the alkyl ethers of mono-, di- and tri-methylol phenols. Various forms of these resins are described in U.S. Pat. Nos. 2,579,329, 2,579,330, 2,579,331, 2,598,406, 2,606,929, 2,606,935 and 2,825,712. These materials are sold under the tradename Methylon ® resins by General Electric Co., Schenectady, NY.

Blocked organic polyisocyanate may be used as the oligomeric component herein. The conventional organic polyisocyanates, as described above, which are blocked with a volatile alcohol, ε-caprolactam, ketoximes or the like, so that they will be unblocked at temperatures above 100° C. may be used. These curing agents are well known in the art.

A masked polyisocyanate may also be used as the curing agent. These masked polyisocyanates, as is known in the art, are not derived from isocyanates but do produce isocyanate groups upon heating at elevated temperatures. Examples of useful masked polyisocyanates include diaminimides

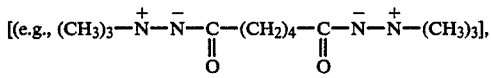

adiponitrile dicarbonate, and the like.

Epoxy resins that can be used in the composition include those having the formula

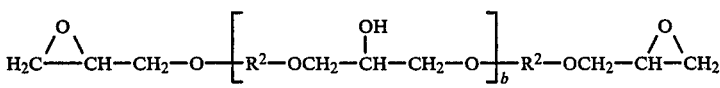

where b is a positive integer of about 1 to 4. Preferably, the epoxy resin is the polymerization product of epichlorohydrin and bisphenol-A. In a preferred epoxy resin, $R^2$ in the above formula is

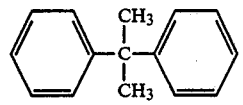

Typical of these preferred epoxy resins is Epon 828 ® having an equivalent weight of about 185–192, manufactured by Shell Chemical Company, Houston, TX and DER 331 having an equivalent weight of about 182–190, manufactured by The Dow Chemical Company, Midland, MI. The equivalent weight is the grams of resin that contain one gram equivalent of epoxide.

An epoxy novolac resin that can be used in the composition has the formula

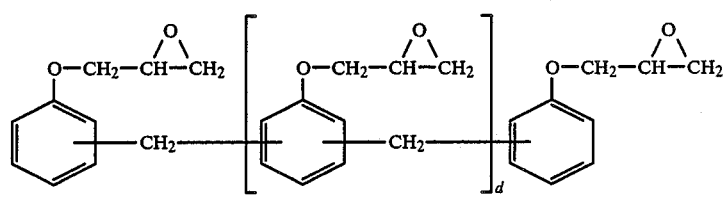

where d is a positive integer of about 1–2. Preferred epoxy novolac resins are DEN 431 where d has an average value of 0.2, DEN 438 where d has an average value of 1.6 and DEN 439 where d has an average value of 1.8. These resins are also manufactured by The Dow Chemical Company.

C. Photoinitiation System

Suitable photoinitiation systems are those which are thermally inactive but which generate free radicals upon exposure to actinic light at or below 185° C. These include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tert-butylanthraquinone, octamethylanthraquinone, 1,4-naphthoquinone, 9,10-phenanthrenequinone, benz(a)anthracene-7,12-dione, 2,3-naphthacene-5,12-dione, 2-methyl-1,4-naphthoquinone, 1,4-dimethylanthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione. Other photoinitiators which are also useful, even though some may be thermally active at temperatures as low as 85° C., are described in U.S. Pat. No. 2,760,863 and include vicinal ketaldonyl alcohols such as benzoin, pivaloin, acyloin ethers, e.g., benzoin methyl and ethyl ethers; α-hydrocarbon-substituted aromatic acyloins, including α-methylbenzoin, α-allylbenzoin and α-phenylbenzoin. Photoreducible dyes and reducing agents disclosed in U.S. Pat. Nos. 2,850,445, 2,875,047, 3,097,096, 3,074,974, 3,097,097, and 3,145,104, as well as dyes of the phenazine, oxazine, and quinone classes, Michler's ketone, benzophenone, 2,4,5-triphenylimidazolyl dimers with hydrogen donors including leuco dyes and mixtures thereof as described in U.S.

Pat. Nos. 3,427,161, 3,479,185 and 3,549,367 can be used as initiators. Also useful with photoinitiators and photoinhibitors are sensitizers disclosed in U.S. Pat. No. 4,162,162. The photoinitiator or photoinitiator system is present in 0.05 to 10% by weight based on the total weight of the dry photopolymerizable layer.

D. Formulation

In formulating the coating compositions of the invention, the order of mixing is not important. In general, they can be formulated most easily by adding the oligomer, which may be either a viscous liquid or a soft solid, and the photoinitiator system, which is normally solvent, to the liquid monomer and then agitating the mixture well to effect complete solution of all the components. This is the procedure which was used to prepare each of the coating compositions which are described in the examples. A very important characteristic of the compositions is that they do not contain any volatile solvents which must be removed from the coating at any time during or after coating.

As indicated above, it is important that the viscosity of the coating composition be suitable for the coating method by which it will be applied. When the composition is applied to a substrate by spin coating, the viscosity of the solution should be at least 10 centipoises (cP) and preferably 10-250 cP. However, if the composition is applied by other means, its viscosity can be much higher. For example, if the composition is applied by curtain coating, the viscosity might be as high as 3000 cP. The viscosity of the coating composition can be adjusted by changing the relative amounts of monomer and oligomer. The amount of oligomer may be as low as only about 1% wt. of the composition when low viscosity coating methods are used, but they may also be as much as 80% wt. for high viscosity coating methods. The photoinitiator system does not exert any significant effect on solution viscosity.

Another important property of the liquid coating composition of the invention is its surface tension, which must be less than 36 dynes/cm in order to obtain proper wetting of the substrate with the coating. In many instances the solution of monomer, oligomer and initiator will have the proper surface tension. However, in those instances where the solution has too high surface tension, it can be lowered by the addition of a small amount of a soluble nonionic surfactant. Fluorinated glycol-type oligomers such as oligomers of fluorinated acrylate esters have been found to be most suitable for this purpose. Many others may, however, be used as well. Even when all of the foregoing monomer criteria are carefully observed, it is still necessary to formulate the composition to ensure that the cured composition has a hardness of at least 2B. The reason for this is that cured coatings softer than 2B have poor film integrity which affects substrate adhesion.

The composition of the invention can in exceptional instances contain dispersed finely divided solids, e.g., polymeric solids, so long as the index of refraction of the solids matches that of the cured matrix in which they are dispersed. Such particles must, however, be very small, on the order of 100 Å or less. The inclusion of such materials can advantageously be used to reduce shrinkage of the coatings still further.

E. Test Procedures

In the examples, the following described test procedures were used:

1. Viscosity

Procedure 1: 1.2 mL of the composition is introduced into a Wells-Brookfield Model RVT Ser. No. 27814 microviscometer fitted with constant-temperature water bath. All measurements are made at 25° C. After a 1 minute temperature equilibration period, three viscosity readings are recorded at 1 minute intervals. The procedure is repeated for two additional 1.2 mL aliquots for a total of nine readings. All readings are taken at 100 RPM. The material viscosity is reported as the average of the nine readings.

Procedure 2: 8.0 mL of the composition is introduced into a Brookfield Model LVTD Ser No. A01770 digital viscometer fitted with "small adaptor," LV spindle, and Endocel Model RTE-9DD refrigerated circulating bath. All measurements are made at 25° C. After a 3 minute temperature equilibration period, a single viscosity reading is recorded at each of the following spindle speeds: 60, 30, 12, 12, 30, 60 RPM. The procedure is repeated for one additional 0.8 mL sample or a total of twelve readings. The material viscosity is reported as the average of the twelve readings.

2. Filtration Procedure

Batches of the composition are filtered through 0.1 μm nominal and 0.2 μm absolute polypropylene filters arranged in series. Filters are cartridge-type purchased from Membrama, Inc., Pleasanton, CA 94566. Pressure ≦5 psi is required for the filtration process.

3. UV Curing and Percent Transmission of Films

The composition is cast into 8"×12" double weight window pane glass using an 8 mil doctor blade (4" wide). The material is cured on a conveyorized UV source (~6 ft/minute; ~6 j/cm$^2$) without a nitrogen blanket. Photospeed is indicated as the number of passes of the UV lamp a sample requires to completely cure. Films are carefully peeled from the glass surface, cut to ~2"×2", and placed in a Perkin-Elmer Model 330 spectrophotometer for percent transmission determination. Percent transmission (% T) is recorded at 632.8 nm, 780 nm, and 830 nm. Six measurements at each wavelength are recorded. The film is removed and reinserted into the sample compartment between each measurement. The instrument is zeroed prior to each insertion of the film sample. The % T is read off the digital display. The percent transmission at each wavelength is reported as the average of the six measurements.

4. Surface Tension

Approximately 50 mL of the composition is poured into a 4-ounce clear straight-shoulder glass jar for use in the surface tension measurement. Six measurements are made at room temperature according to the instruction manual for the Fisher Model 21 Surface Tensiomat. The surface tension (dynes/cm) is reported as the average of the six measurements.

5. Percent Photoinitiator

A 1 mm path length quartz spectrophotometer cell is filled with the composition and inserted into the sample compartment of a Perkin-Elmer Model 330 spectrophotometer zeroed at 340 nm (absorption mode). An empty 1 mm cell is placed in the reference compartment. The optical density of the material is read off the digital display. The optical density at 350 nm is directly proportional to the percent photoinitiator as follows:

| OD | % PHOTOINITIATOR (Irgacure 651) |
|---|---|
| 3.195 | 2.68 |

| -continued | |
|---|---|
| OD | % PHOTOINITIATOR (Irgacure 651) |
| 2.940 | 2.46 |

6. Index of Refraction

Index of refraction of solutions and films are measured according to the instructions provided for a Fisher Abbe Refractometer cooled at 20° C. using a temperature-controlled water bath.

7. Pencil Hardness

In this test, pencil leads of increasing hardness values are forced against a coated surface in a precisely defined manner until one lead mars the surface. Surface hardness is defined by the hardest pencil grade which just fails to mar the surface.

Pencil leads, softest to hardest, are as follows: 6B, 5B, 4B, 3B, 2B, B, HB, F, H, 2H, 3H, 4H, 5H, 6H, 7H, 8H, 9H.

Begin testing using a Gardco ® pencil hardness gage and the hardest pencil. Grasp the holder firmly and bring the tube end down onto the test surface. Rotate until the selected pencil is nearest the operator and then incline the assembly downward until the lead point and the tube end are simultaneously in contact with the surface. This defines the correct lead angle of 45° to the surface. Push the gage forward (away) about one-half inch. Observe the pencil track. Sufficient pressure must have been applied either to cut or mar the film or to crush the sharp corner of the lead. If neither marring nor crushing is observed, repeat the test with greater pressure applied until a definite observation is made. If crushing of the hardest lead should occur, the film is extremely hard and is beyond the measuring range of the test. If scratching or marring of the film occurs, proceed with the next softer pencil grade and repeat the testing process until a test lead is found which crushes and does not mar the film. This is the pencil hardness of the film.

In the following examples, the listed numbers and abbreviations refer to particular proprietary materials as indicated below:

A. Epoxy (acrylated epoxy) Oligomer

The following numbers refer to Celrad oligomers: 3200, 3201, 3500, 3600, 3700, 3701, 3702, 3703.

B. Acrylate (acrylated acrylate) Oligomer

The following number refers to Celrad oligomer: 6700.

C. Urethane (acrylated urethane) Oligomer

The following numbers refer to urethane oligomers: UV 783, UV 782, UV 788, UV 893. The following numbers refer to Celrad oligomers: 1700, 7100, 1701.

D. Photoinitiator
  651 Irgacure 651

E. Surfactant
  FC-430 Fluorad FC-430
  V-516 Ganvex V-516
  HFBMA 1H,1H-heptafluorobutyl methacrylate (PCR Research Chemicals, Inc.)
  S-100 Lodyne S-100
  OFPA 1H,1H,5H-octafluoropentyl acrylate (PCR Research Chemicals, Inc.)
  PDFOA 1H,1H-pentadecafluorooctyl acrylate (PCR Research Chemicals, Inc.)
  9008 Chemlink 9008

In the examples the following qualitative designations are used for the flexibility, adhesion and surface texture measurements.

Flexibility:
  1 Flexible
  2 Moderately flexible
  3 Moderately brittle
  4 Brittle Adhesion:
  1 Poor
  2 Fair
  3 Good
  4 Excellent Surface Texture:
  0 None
  1 Slight
  2 Some
  3 Pronounced/crazed

EXAMPLES

Several series of compositions were prepared and tested in the manner described hereinabove. In particular, these series were designed to show the importance of the many compositional variables and limiting criteria of the invention. These are shown by the following six categories of examples, within each of which category such variables as the amount of each component and the composition of the surfactants may be illustrated as well.

| Example | Monomer Composition | Oligomer Composition |
|---|---|---|
| 1–26 | Glycol acrylates | Epoxy oligomers |
| 27–80 | Glycol acrylates | Urethane oligomers |
| 99–118 | Alkyl acrylates | Urethane oligomers |
| 119–148 | Alkyl acrylates | Epoxy oligomers |
| 151–230 | Cyclic alkyl acrylates | Epoxy oligomers |
| 231–250 | Cyclic alkyl acrylates | Acrylate oligomers |

The results of each of these series are given in the following table:

| EXAMPLE NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Coating Composition | | | | | | | | | | | | | | | | |
| Monomer 1 Composition | TDMA | TDMA | TDMA | TDMA | TDMA | TDMA | TDMA | TDMA | TDMA | PEGDMA | TDMA | TDMA | TDMA | THFA | PEA | THFA |
| % Wt. | 76.9 | 76.9 | 76.9 | 76.9 | 76.9 | 76.9 | 82.7 | 80.0 | 84.1 | 68.0 | 56.4 | 83.8 | 84.4 | 68.1 | 86.0 | 56.8 |
| Monomer 2 Composition | HDODMA | — | — | — | — | — | — | — | — | TDMA | HEMA | — | — | — | — | HDODMA |
| % Wt. | 38.8 | — | — | — | — | — | — | — | — | 18.5 | 25.2 | — | — | — | — | 8.3 |
| Oligomer 1 Composition | 3201 | 3600 | 3700 | 3701 | 3702 | 3703 | 3700 | 3600 | 3701 | 3701 | 3701 | 3702 | 3703 | 3600 | 3600 | 3600 |
| % Wt. | 19.2 | 19.2 | 19.2 | 38.5 | 19.2 | 19.2 | 14.4 | 17.5 | 14.4 | 12.3 | 16.8 | 13.5 | 13.0 | 29.4 | 11.5 | 32.8 |
| Oligomer 2 Composition | — | — | — | — | — | — | — | — | — | — | — | — | — | — | — | — |
| % Wt. | — | — | — | — | — | — | — | — | — | — | — | — | — | — | — | — |
| Photoinitiator % Wt. | 3.8 | 3.8 | 3.8 | 3.8 | 3.8 | 3.8 | 2.8 | 2.8 | 1.4 | 1.2 | 1.7 | 2.7 | 2.6 | 2.5 | 2.5 | 2.1 |
| Surfactant Composition | — | — | — | — | — | — | — | — | — | — | — | — | — | — | — | — |
| % Wt. | — | — | — | — | — | — | — | — | — | — | — | — | — | — | — | — |
| Coating Properties | | | | | | | | | | | | | | | | |
| Uncured Liquid | | | | | | | | | | | | | | | | |
| Viscosity, cP | 18.3–20.0 | 31.4 | 32.5 | 185 | 34.5 | 36.3 | 19.0 | 21.2 | 23.5 | 28.7 | 21.9 | 19.4 | 19.9 | 16.7 | 17.6 | — |
| Surface Tension, dyne/cm | — | — | — | — | — | — | — | 38.9 | — | — | — | — | — | — | — | — |
| Cured Solid Coating | | | | | | | | | | | | | | | | |
| Hardness | H–2H | 3B | 2H | H | H | H | 2H | H | H | HB | H | H | H | <3B | <3B | 2B |
| Flexibility | 2 | 2 | 2 | 2 | 2 | 4 | 1 | 2–3 | 1 | 1 | 2 | 2 | 2 | 0 | 0 | 1 |
| Adhesion | 1 | 1 | 1 | 1 | 1 | 1 | 1 | 1 | 1 | 1 | 1 | 1 | 1 | 4 | 4 | 1 |
| Surface Texture | 0 | 0 | 0 | 0 | 0 | 0 | 1 | 0 | 1 | 3 | 2 | 2 | 2 | 2 | 3 | 3 |
| No. of Passes to Cure | 3 | 2 | 4 | 2 | 4 | 4 | 3 | 2 | 4 | 4 | 4 | 3 | 3 | 2 | 2 | 1 |
| Classification of Monofunctional Monomers (1) | | | | | | | | | | | | | | | | |
| Mutually soluble cyclic acrylate | | | | | | | | | | | | | | | | |
| ≅ C₄ Blanched acrylate | | | | | | | | | | | | | | x | x | x |
| ≅ C₄ Linear acrylate | | | | | | | | | | | | | | | | |

| EXAMPLE NO. | 17 | 18 | 19 | 20 | 21 | 22 | 23 | 24 | 25 | 26 | 27 | 28 | 29 | 30 |
|---|---|---|---|---|---|---|---|---|---|---|---|---|---|---|
| Coating Composition | | | | | | | | | | | | | | |
| Monomer 1 Composition | PEA | PEA | THFA | glycidyl acrylate | MOEA* | TDA** | TPGDA | glycidyl acrylate | glycidyl acrylate | glycidyl acrylate | EOEOEA | EOEOEA | EOEOEA | EOEOEA |
| % Wt. | 71.7 | 74.5 | 59.2 | 76.9 | 78.0 | 85.0 | 85.0 | 68.1 | 56.5 | 76.9 | 77.0 | 77.1 | 77.0 | 76.8 |
| Monomer 2 Composition | HDODMA | Photomer 4072 | Photomer 4072 | — | — | — | — | — | TEDA*** | — | — | — | — | — |
| % Wt. | 8.3 | 13.0 | 13.0 | — | — | — | — | — | 16.6 | — | — | — | — | — |
| Oligomer 1 Composition | 3600 | 3600 | 3600 | 3600 | 3600 | 3600 | 3600 | 3600 | 3600 | 3600 | UV893 | UV783 | UV782 | UV788 |
| % Wt. | 17.9 | 10.0 | 25.6 | 19.2 | 19.5 | 12.5 | 12.5 | 29.4 | 24.4 | 19.2 | 19.1 | 19.1 | 19.2 | 19.4 |
| Oligomer 2 Composition | — | — | — | — | — | — | — | — | — | — | — | — | — | — |
| % Wt. | — | — | — | — | — | — | — | — | — | — | — | — | — | — |
| Photoinitiator % Wt. | 2.1 | 2.2 | 2.2 | 2.5 | 2.5 | 2.5 | 2.5 | 2.5 | 2.5 | 2.5 | 3.9 | 3.9 | 3.8 | 3.8 |
| Surfactant Composition | — | — | — | — | — | — | — | — | — | — | — | — | — | — |
| % Wt. | — | — | — | — | — | — | — | — | — | — | — | — | — | — |
| Coating Properties | | | | | | | | | | | | | | |
| Uncured Liquid | | | | | | | | | | | | | | |
| Viscosity, cP | — | — | — | — | 3.0 | 20.3 | 21.0 | — | — | 8.1 | 14.1 | 16.7 | 40.6 | 20.7 |
| Surface Tension, dyne/cm | — | — | — | — | — | — | — | — | — | — | 35.3 | 35.4 | 35.5 | 35.3 |
| Cured Solid Coating | | | | | | | | | | | | | | |
| Hardness | 3B | 3B | 2B | H | <3B | 2H | HB | 2H | 2H | 3B | <4B | <4B | <4B | <4B |

| EXAMPLE NO. | 31 | 32 | 33 | 34 | 35 | 36 | 37 | 38 | 39 | 40 | 41 | 42 | 43 |
|---|---|---|---|---|---|---|---|---|---|---|---|---|---|
| Coating Composition | | | | | | | | | | | | | |
| Monomer 1 Composition | TEDA*** | TDMA | TDMA | Rohm & Haas triacrylate | Rohm & Haas diacrylate | TDMA | TDMA | Rohm & Haas diacrylate | Rohm & Haas diacrylate | Rohm & Haas diacrylate | Rohm & Haas diacrylate | Rohm & Haas diacrylate | EOEO EA |
| % Wt. | 96.2 | 86.6 | 86.6 | 96.2 | 96.2 | 76.9 | 76.9 | 66.1 | 84.3 | 58.1 | 71.0 | 70.9 | 52.5 |
| Monomer 2 Composition | — | — | — | — | — | — | — | HDODMA | MMA | NPGDMA | CHA | CHMA | TMPTA |
| % Wt. | — | — | — | — | — | — | — | 31.3 | 12.4 | 39.7 | 26.2 | 26.3 | 31.8 |
| Oligomer 1 Composition | — | UV893 | UV783 | — | — | UV893 | UV783 | — | — | — | — | — | UV783 |
| % Wt. | — | 9.6 | 9.6 | — | — | 19.2 | 19.2 | — | — | — | — | — | 13.0 |
| Oligomer 2 Composition | — | — | — | — | — | — | — | — | — | — | — | — | — |
| % Wt. | — | — | — | — | — | — | — | — | — | — | — | — | — |
| Photoinitiator % Wt. | 3.8 | 3.8 | 3.8 | 3.8 | 3.8 | 3.8 | 3.8 | 2.6 | 3.3 | 2.3 | 2.8 | 2.8 | 2.7 |
| Surfactant Composition | — | — | — | — | — | — | — | — | — | — | — | — | — |
| % Wt. | — | — | — | — | — | — | — | — | — | — | — | — | — |
| Coating Properties | | | | | | | | | | | | | |
| Uncured Liquid | | | | | | | | | | | | | |
| Viscosity, cP | 22.4 | 21.9 | 20.7 | 488 | 80.7 | 48.9 | 52.7 | 19.9 | 24.6 | 22.2 | 22.0 | 22.6 | 21.2 |
| Surface Tension, dyne/cm | — | 38.5 | 38.5 | — | — | — | — | — | — | 36.1 | — | — | — |
| Cured Solid Coating | | | | | | | | | | | | | |
| Hardness | 3B | H | 2H | HB | 3B | H | H | B-F | 3B | H | 3B | B | <4B |
| Flexibility | 1 | 3 | 2 | 1 | 1 | 3 | 3 | 2 | 1 | 2 | 1 | 1 | 0 |
| Adhesion | 1 | 1 | 1 | 3 | 1 | 1 | 1 | 1 | 1 | 1 | 1 | 1 | 1 |
| Surface Texture | 1 | 1 | 0 | 3 | 0 | 1 | 0 | 2 | 3 | 0 | 3 | 0 | 3 |
| No. of Passes to Cure | 1 | 3 | 3 | 1 | 1 | 4 | 3 | 3-4 | 1 | 3 | 3 | 2 | 2 |
| Classification of Monofunctional Monomers (1) | | | | | | | | | | | | | |
| Mutually soluble cyclic acrylate | x | x | x | x | x | x | x | x | x | x | x | x | x |
| ≥ll C₄ Blanched acrylate | | | | | | | | | | | | | |
| ≥ll C₄ Linear acrylate | | | | | | | | | | | | | |

| EXAMPLE NO. | 44 | 45 | 46 | 47 | 48 | 49 | 50 | 51 | 52 | 53 | 54 | 55 | 56 |
|---|---|---|---|---|---|---|---|---|---|---|---|---|---|
| Coating Composition | | | | | | | | | | | | | |
| Monomer 1 Composition | EOEOEA | EOEOEA | EOEOEA | EOEOEA | EOEOEA | TDMA | EOEOEA | EOEOEA | TDMA | TDMA | TDMA | TDMA | PEGDMA |
| % Wt. | 63.1 | 60.4 | 50.9 | 63.5 | 60.5 | 67.0 | 55.1 | 62.8 | 76.9 | 76.9 | 87.3 | 84.1 | 47.1 |
| Monomer 2 Composition | PETA | Rohm & Haas diacrylate | TMPTA | PETA | Rohm & Haas diacrylate | Rohm & Haas triacrylate | BDODMA | CHMA | — | — | — | — | TDMA |
| % Wt. | 18.0 | 21.6 | 33.9 | 17.5 | 21.5 | 31.7 | 28.5 | 18.4 | — | — | — | — | 40.7 |
| Oligomer 1 Composition | UV893 | UV893 | UV783 | UV783 | UV783 | — | UV782 | UV782 | 1700 | 7100 | 1700 | 7100 | 7100 |
| % Wt. | 15.7 | 15.0 | 12.6 | 15.7 | 15.0 | — | 13.7 | 15.7 | 19.2 | 19.2 | 10.5 | 13.2 | 10.2 |
| Oligomer 2 Composition | — | — | — | — | — | — | — | — | — | — | — | — | — |

-continued

| EXAMPLE NO. | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|
| Coating Composition | | | | | | | | | | | | | | | |
| Monomer 1 Composition | TDMA | Rohm & Haas diacrylate | TEDA*** | TDA** | TDA** | TDA** | TDA** | TDA** | TDA** | TDA** | TDA** | TDA** | TDA** | TDA** | TDA** |
| % Wt. | 96.2 | 54.0 | 96.2 | 79.3 | 87.8 | 86.9 | 86.9 | 86.9 | 85.2 | 43.4 | 86.9 | 86.9 | 86.9 | 86.9 | 86.9 |
| Monomer 2 Composition | — | TDMA | — | — | — | — | — | — | — | TDMA | — | — | — | — | — |
| % Wt. | — | 43.9 | — | — | — | — | — | — | — | 39.6 | — | — | — | — | — |
| Oligomer 1 Composition | — | — | — | 7100 | 7100 | 7100 | 7100 | 7100 | 7100 | 7100 | 7100 | 7100 | 7100 | 7100 | 7100 |
| % Wt. | — | — | — | 18.2 | 10.7 | 10.6 | 10.6 | 10.6 | 10.4 | 14.4 | <10.6 | 10.6 | 10.6 | 10.6 | 10.6 |
| Oligomer 2 Composition | — | — | — | — | — | — | — | — | — | — | — | — | — | — | — |
| % Wt. | — | — | — | — | — | — | — | — | — | — | — | — | — | — | — |
| Photoinitiator % Wt. | 3.8 | 2.2 | 3.8 | 2.5 | 1.5 | 2.5 | 2.5 | 2.5 | 2.4 | 2.5 | 2.5 | 2.5 | 2.5 | 2.5 | 2.5 |
| Surfactant Composition | — | — | — | — | — | — | FC-430 | FC-430 | Ganex V-516 | — | FC-430 | FC-430 | FC-430 | FC-430 | FC-430 |
| % Wt. | — | — | — | — | — | — | 1.0 | 0.1 | 2.0 | — | 1.0 | 0.55 | 0.11 | 0.06 | 0.01 |
| Coating Properties | | | | | | | | | | | | | | | |
| Uncured Liquid | | | | | | | | | | | | | | | |
| Viscosity, cP | 9.8 | 20.0 | 20.8 | 40.1 | 22.4 | 20.2 | 20.0 | 20 | Incompatible | — | 20.0 | 20.0 | 20.0 | 20.0 | 20.0 |
| Surface Tension, dyne/cm | — | 40.2 | 42.8 | — | — | 41.3/40.6 | 21.6 | 26.9 | | — | 22.8 | 23.1 | 26.9 | 30.0 | 37.9 |
| Cured Solid Coating | | | | | | | | | | | | | | | |
| Hardness | H 2-3 | B | H | HB | 2H | 2H | H-2H | H-2H | | | | | | | |
| Flexibility | 1 | 1 | 2 | 1 | — | 2 | 2 | 2 | | 2 | 2 | 2 | 2 | 2 | 2 |
| Adhesion | 1 | 1 | 1 | 1 | 1 | 1 | 1 | 1 | | 1 | 1 | 1 | 1 | 1 | 1 |
| Surface Texture | 3 | 1 | 2 | 1 | — | 1 | 0 | 0 | | 0 | 0 | 0 | 0 | 0 | 0 |
| No. of Passes to Cure | 3 | 2 | 2 | 1 | — | — | 1 | 1 | | 1 | 1 | 1 | 1 | 1 | 1 |
| Classification of Monofunctional Monomer (1) | | | | | | | | | | | | | | | |
| Mutually soluble cyclic acrylate | | | | | | | | | | | | | | | |
| ≥ C4 Branched acrylate | | | | | | | | | | | | | | | |
| ≅ C4 Linear acrylate | | | | | | | | | | | | | | | |

-continued

| EXAMPLE NO. | | 72 | 73 | 74 | 75 | 76 | 77 | 78 | 79 | 80 |
|---|---|---|---|---|---|---|---|---|---|---|
| Coating Composition | | | | | | | | | | |
| Monomer 1 | Composition | TDA** | TDA** | TDMA | TDMA | TDMA | Photomer 4072 | TDA** | TDA** | TDA** |
| | % Wt. | 86.9 | 86.9 | 85.1 | 87.7 | 79.3 | 50.0 | 82.8 | 78.0 | 50.0 |
| Monomer 2 | Composition | — | — | — | — | — | PEA | — | — | — |
| | % Wt. | — | — | — | — | — | 47.6 | — | — | — |
| Oligomer 1 | Composition | 7100 | 7100 | UV893 | 1700 | 7100 | — | 7100 | 7100 | 7100 |
| | % Wt. | 10.6 | 10.6 | 11.2 | 9.4 | 18.2 | — | 10.1 | 19.5 | 47.5 |
| Oligomer 2 | Composition | — | — | — | — | — | Parlon S5 | — | — | — |
| | % Wt. | — | — | — | — | — | 4.8 | — | — | — |
| Photoinitiator | % Wt. | 2.5 | 2.5 | 2.7 | 2.9 | 2.5 | 2.5 | 2.4 | 2.5 | 2.5 |
| Surfactant | Composition | FC-430 | FC-430 | — | — | — | — | — | — | — |
| | % Wt. | 0.005 | 0.001 | — | — | — | — | — | — | — |
| Coating Properties | | | | | | | | | | |
| *Uncured Liquid* | | | | | | | | | | |
| Viscosity, cP | | 20.0 | 20.0 | 20.0 avg. | 21.4 avg. | 20.2 avg. | 26.5 | 42.4 | 28.8 | 93.3 |
| Surface Tension, dyne/cm | | 39.2 | 39.2 | — | — | — | — | — | — | — |
| *Cured Solid Coating* | | | | | | | | | | |
| Hardness | | — | — | 2B-F | 2B-F | 2H | H | HB | — | — |
| Flexibility | | 2 | 2 | — | — | — | 2 | 3 | — | — |
| Adhesion | | 1 | 1 | 1 | 1 | — | 1 | 1 | — | — |
| Surface Texture | | 1 | 1 | 1 | 1 | 1 | 3 | 3 | — | — |
| No. of Passes to Cure | | 1 | 1 | 4 | 3 | — | 3 | 1 | — | — |

Classification of Monofunctional Monomer (1)
Mutually soluble cyclic acrylate
≧ C₄ Branched acrylate
≧ C₄ Linear acrylate

| EXAMPLE NO. | | 105 | 106 | 107 | 108 | 109 | 110 | 111 | 112 | 113 | 114 | 115 | 116 | 117 | 118 | 119 | 120 |
|---|---|---|---|---|---|---|---|---|---|---|---|---|---|---|---|---|---|
| Coating Composition | | | | | | | | | | | | | | | | | |
| Monomer 1 | Composition | HDODMA | HDODMA | HDODMA | HDODMA | TMPTA | HDODMA | TMPTA | ODA | ODA | nLA | nLA | iDA | iDA | 2EHA | HDODMA | HDODMA |
| | % Wt. | 70.9 | 56.3 | 77.3 | 76.9 | 51.5 | 60.0 | 54.1 | 64.0 | 68.0 | 68.0 | 68.0 | 68.0 | 68.0 | 68.0 | 76.8 | 76.9 |
| Monomer 2 | Composition | EDEOEA | Rohm & Haas triacrylate | — | — | TDMA | TDMA | TDMA | — | — | — | — | — | — | — | — | — |
| | % Wt. | 7.9 | 42.0 | — | — | 46.4 | 22.1 | 43.5 | — | — | — | — | — | — | — | — | — |
| Oligomer 1 | Composition | UV893 | — | 1700 | 7100 | — | UV783 | — | 7100 | 1700 | 7100 | 1701 | 7100 | 1701 | 1701 | 3201 | 3600 |
| | % Wt. | 17.7 | — | 18.9 | 19.2 | — | 14.9 | — | 29.4 | 29.4 | 29.4 | 29.4 | 29.4 | 29.4 | 29.4 | 19.3 | 19.2 |
| Oligomer 2 | Composition | — | — | — | — | — | — | — | — | — | — | — | — | — | — | — | — |
| | % Wt. | — | — | — | — | — | — | — | — | — | — | — | — | — | — | — | — |
| Photoinitiator | % Wt. | 3.5 | 1.7 | 3.9 | 3.8 | 2.1 | 3.0 | 2.3 | 2.5 | 2.5 | 2.5 | 2.5 | 2.5 | 2.5 | 2.5 | 3.8 | 3.4 |
| Surfactant | Composition | — | — | — | — | — | — | — | — | — | — | — | — | — | — | — | — |
| | % Wt. | — | — | — | — | — | — | — | — | — | — | — | — | — | — | — | — |
| Coating Properties | | | | | | | | | | | | | | | | | |
| *Uncured Liquid* | | | | | | | | | | | | | | | | | |
| Viscosity, cP | | 22.5 | 21.4 | 31.9 | 24.1 | 23.4 | 20.4 avg. | 21.9 | Incompatible | 55.4 | Incompatible | 25.6 | Incompatible | 51.5 | 30.0 | 15.8 | 19.6 |
| Surface Tension, dyne/cm | | 36.2 | — | — | 36.1 | 38.3 | 36.5 | — | — | — | — | — | — | — | — | — | 36.7 |

| EXAMPLE NO. | | 100 | 101 | 102 | 103 | 104 |
|---|---|---|---|---|---|---|
| Coating Composition | | | | | | |
| Monomer 1 | Composition | HDODMA | HDODMA | HDODMA | HDODMA | HDODMA |
| | % Wt. | 77.0 | 77.1 | 76.8 | 76.5 | 72.0 |
| Monomer 2 | Composition | — | — | — | — | EOEOEA |
| | % Wt. | — | — | — | — | 6.6 |
| Oligomer 1 | Composition | UV893 | UV783 | UV782 | UV788 | UV783 |
| | % Wt. | 19.2 | 19.1 | 19.4 | 19.7 | 17.8 |
| Photoinitiator | % Wt. | 3.8 | 3.8 | 3.8 | 3.8 | 3.5 |
| Coating Properties | | | | | | |
| Viscosity, cP | | 28.6 | 29.9 | Incompatible | Incompatible | 23.5 |
| Surface Tension, dyne/cm | | 36.3 | 36.0 | | | |
| Hardness | | 2H | 2H | | | <4B |
| Flexibility | | 3 | 3 | | | 0 |
| Adhesion | | 1 | 1 | | | 1 |
| Surface Texture | | 0 | 0 | | | 0 |
| No. of Passes to Cure | | 4 | 4 | | | 4 |

-continued

| EXAMPLE NO. | 121 | 122 | 123 | 124 | 125 | 126 | 127 | 128 | 129 | 130 | 131 | 132 | 133 | 134 | 135 | 136 | 137 |
|---|---|---|---|---|---|---|---|---|---|---|---|---|---|---|---|---|---|
| Coating Composition | | | | | | | | | | | | | | | | | |
| Monomer 1 Composition | HDODMA | HDODMA | HDODMA | HDODMA | HDODMA | HDODMA | ODMA | nLMA | ODA | nLMA | 2EHA | iDA | TMPTA | iBA | iOA | iOA | 3,5,5 trimethyl hexyl acrylate |
| % Wt. | 76.9 | 57.7 | 76.9 | 76.9 | 74.0 | 66.0 | 85.5 | 73.0 | 68.1 | 68.1 | 68.1 | 68.1 | 50.0 | 68.0 | 68.1 | — | 68.1 |
| Monomer 2 Composition | — | — | — | — | — | — | — | — | — | — | — | — | PEA | — | — | — | — |
| % Wt. | — | — | — | — | — | — | — | — | — | — | — | — | 47.4 | — | — | — | — |
| Oligomer 1 Composition | 3700 | 3701 | 3702 | 3703 | 3600 | 3201 | 3600 | 3600 | 3600 | 3600 | 3600 | 3600 | — | 3600 | 3600 | 3201 | 3600 |
| % Wt. | 19.2 | 38.5 | 19.2 | 19.2 | 22.2 | 31.6 | 12.0 | 24.5 | 29.4 | 29.4 | 29.4 | 29.4 | — | 29.4 | 29.4 | 37.5 | 29.4 |
| Oligomer 2 Composition | — | — | — | — | — | — | — | — | — | — | — | — | — | — | — | — | — |
| % Wt. | — | — | — | — | — | — | — | — | — | — | — | — | — | — | — | — | — |
| Photoinitiator % Wt. | 3.8 | 3.8 | 3.8 | 3.8 | 3.7 | 2.3 | 2.5 | 2.5 | 2.5 | 2.5 | 2.5 | 2.5 | 2.6 | 2.5 | 2.5 | 2.5 | 2.5 |
| Surfactant Composition | — | — | — | — | — | — | — | — | — | — | — | — | — | — | — | — | — |
| % Wt. | — | — | — | — | — | — | — | — | — | — | — | — | — | — | — | — | — |
| Coating Properties | | | | | | | | | | | | | | | | | |
| Uncured Liquid | | | | | | | | | | | | | | | | | |
| Viscosity, cP | 20.3 | 126 | 23.0 | 22.9 | 21.7 | 22.8 | Incompatible | Incompatible | Incompatible | Incompatible | 10.8 (cloudy) | Incompatible | 22.1 | 5.0 | — | — | — |
| Surface Tension, dyne/cm | — | — | — | — | — | — | | | | | | | — | — | — | — | — |
| Cured Solid Coating | | | | | | | | | | | | | | | | | |
| Hardness | 2H | 6H | 5H | 3H | H | H | | | | | F | | 3H | F | 3B | 3B | 3B |
| Flexibility | 4 | 2 | 3 | 4 | 2 | 2 | | | | | 2–3 | | 4 | 2 | 1 | 1 | 1 |
| Adhesion | 1 | 1 | 1 | 1 | 1 | 1 | | | | | 2–3 | | 1 | 4 | 2–3 | 3 | 2 |
| Surface Texture | 1 | 1 | 3 | 1 | 1 | 2 | | | | | 3 | | 3 | 3 | 3 | 3 | 3 |
| No. of Passes to Cure | 4 | 3 | 5 | 5 | 4 | 4 | | | | | 3 | | 3 | 3 | 2 | 2 | 2 |
| Classification of Monofunctional Monomer (1) | | | | | | | | | | | | | | | | | |
| Mutually soluble cyclic acrylate | | | | | | | | | | | | | x | x | | | |
| ≧ C4 Branched acrylate | | | | | | | | | | | x | x | | | | | x |
| ≧ C4 Linear acrylate | | | | | | | x | x | x | x | | | | | x | x | |

| EXAMPLE NO. | 138 | 139 | 140 | 141 | 142 | 143 | 144 | 145 | 146 | 147 | 148 | 151 | 152 | 153 | 154 | 155 | 156 | 157 | 158 |
|---|---|---|---|---|---|---|---|---|---|---|---|---|---|---|---|---|---|---|---|
| Coating Composition | | | | | | | | | | | | | | | | | | | |
| Monomer 1 Composition | 3,5,5 trimethyl | nOA | nOA | 2-OA | 2-OA | iBMA | nHA | nHEPA | 2EHA | 2EBA | iBMA | CHMA | CHMA | CHMA | CHMA | CHMA | CHMA | CHMA | CHMA |

-continued

| | | 159 | 160 | 161 | 162 | 163 | 164 | 165 | 166 | 167 | 168 | 169 | 170 | 171 | 172 | 173 | 174 | 175 | 176 | 177 |
|---|---|---|---|---|---|---|---|---|---|---|---|---|---|---|---|---|---|---|---|---|
| Monomer 2 | % Wt. hexyl acrylate | 60.0 | 77.0 | 70.0 | 60.0 | 47.5 | 47.5 | 60.0 | 60.0 | 60.0 | 55.0 | 47.5 | 76.9 | 76.9 | 76.9 | 76.9 | 57.7 | 76.9 | 76.9 | 66.7 | 66.0 |
| Oligomer 1 | Composition % Wt. | 3201 37.5 | 3600 20.5 | 3201 27.5 | 3600 37.5 | 3201 50.0 | 3600 50.0 | 3600 37.5 | 3600 37.5 | 3201 37.5 | 3600 42.5 | 3600 50.0 | 3201 19.2 | 3600 19.2 | 3700 19.2 | 3700 19.2 | 3701 38.5 | 3702 19.2 | 3703 19.2 | 3700 30.1 | 3600 30.7 |
| Oligomer 2 | Composition % Wt. | — | — | — | — | — | — | — | — | — | — | — | — | — | — | — | — | — | — | — | — |
| Photoinitiator | % Wt. | 2.5 | 2.5 | 2.5 | 2.5 | 2.5 | 2.5 | 2.5 | 2.5 | 2.5 | 2.5 | 2.5 | 3.8 | 3.8 | 3.8 | 3.8 | 3.8 | 3.8 | 3.8 | 3.1 | 3.3 |
| Surfactant | Composition % Wt. | — | — | — | — | — | — | — | — | — | — | FC-430 | — | — | — | — | — | — | — | — | — |
| Coating Properties | | | | | | | | | | | | | | | | | | | | | |
| Uncured Liquid | | | | | | | | | | | | | | | | | | | | | |
| Viscosity, cP | | — | — | — | — | 30.2 | — | — | 11.2 | — | — | — | 8.8 | 8.4 | — | 10.2 | 73 | — | 20.2 | 19.8 |
| Surface Tension, dyne/cm | | — | — | — | — | — | — | — | — | — | — | — | — | — | — | — | — | — | 34.2 | 33.9 |
| Cured Solid Coating | | | | | | | | | | | | | | | | | | | | | |
| Hardness | | 3B | <3B | <3B | 3B | 2H | 2H | <3B | 3B | 3B | 2H | 2H | HB | 2H | HB | H | HB | Incom-patible | 2H | H |
| Flexibility | | 0 | 0 | 0 | 1 | 1 | 1 | | 0 | 3-4 | 2 | | 4 | 4 | 4 | 4 | 4 | | 4 | 4 |
| Adhesion | | 1 | 0 | 0 | 3 | 2-3 | 3 | | 0 | — | 3 | | 4 | 4 | 4 | 4 | 4 | | 4 | 4 |
| Surface Texture | | 3 | 3 | 3 | 1 | 1 | 1 | | 3 | 3 | 3 | | 1 | 0 | 1 | 3 | 1 | | 1 | 0 |
| No. of Passes to Cure | | 2 | 2 | 2 | | | 2 | | 2 | 3 | 1 | | 2 | 3 | 2 | 4 | 2 | | 3 | 2 |
| Classification of Monofunctional Monomers (1) | | | | | | | | | | | | | | | | | | | | | |
| Mutually soluble cyclic acrylate | | x | x | | | x | x | x | x | x | x | x | x | x | x | x | x | x | x | x |
| ≧ C4 Branched acrylate | | | | x | | | | | | | | | | | | | | | | |
| ≧ C4 Linear acrylate | | | | | x | | | | | | | | | | | | | | | |

| EXAMPLE NO. | 159 | 160 | 161 | 162 | 163 | 164 | 165 | 166 | 167 | 168 | 169 | 170 | 171 | 172 | 173 | 174 | 175 | 176 | 177 |
|---|---|---|---|---|---|---|---|---|---|---|---|---|---|---|---|---|---|---|---|
| Coating Composition | | | | | | | | | | | | | | | | | | | | |
| Monomer 1 Composition | CHA | CHA | CHA | CHA | CHA | CHA | CHA | CHA | CHA | CHA | CHA | PEA | CHA | CHA | CHA | CHA | CHA | CHA | CHA |
| % Wt. | 65.2 | 70.8 | 66.7 | 62.9 | 68.9 | 68.9 | 59.3 | 59.3 | 67.8 | 68.1 | 68.1 | 68.1 | 68.1 | 68.1 | 68.1 | 68.1 | 68.1 | 68.1 | 68.1 |
| Monomer 2 Composition | — | — | — | — | — | — | HEA | TDA** | — | — | — | — | — | — | — | — | — | — | — |
| % Wt. | — | — | — | — | — | — | 9.1 | 9.1 | — | — | — | — | — | — | — | — | — | — | — |
| Oligomer 1 Composition | 3600 | 3702 | 3700 | 3201 | 3200 | 3500 | 3600 | 3600 | 3600 | 3600 | 3600 | 3600 | 3600 | 3600 | 3600 | 3600 | 3600 | 3600 | 3600 |
| % Wt. | 31.5 | 26.0 | 30.1 | 34.0 | 28.0 | 28.0 | 28.6 | 28.6 | 29.2 | 29.4 | 29.4 | 29.4 | 29.4 | 29.4 | 29.4 | 29.4 | 29.4 | 29.4 | 29.4 |
| Oligomer 2 Composition | — | — | — | — | — | — | — | — | — | — | — | — | — | — | — | — | — | — | — |
| % Wt. | — | — | — | — | — | — | — | — | — | — | — | — | — | — | — | — | — | — | — |
| Photoinitiator % Wt. | 3.3 | 3.1 | 3.1 | 3.1 | 3.1 | 3.1 | 3.0 | 3.0 | 3.1 | 2.5 | 2.5 | 2.5 | 2.5 | 2.5 | 2.5 | 2.5 | 2.5 | 2.5 | 2.5 |
| Surfactant Composition | — | — | — | — | — | — | — | — | — | — | — | — | FC-430 | FC-430 | Ganex V-516 | HFBMA | S-100 | OFPA | PDFOA |
| % Wt. | — | — | — | — | — | — | — | — | — | — | — | — | 1 | 1 | 2 | 0.5 | 1 | 0.5 | 0.5 |
| Coating Properties | | | | | | | | | | | | | | | | | | | | |
| Uncured Liquid | | | | | | | | | | | | | | | | | | | | |
| Viscosity, cP | 19.5–21.9 | 14.1 | 17.4 | 15.1 | 10.3 | 15.3 | 21.8 | 21.2 | 18.2 | 20.0 | — | 16.1 | 20.0 | — | — | — | — | — | — |
| Surface Tension, dyne/cm | | | | | | | | | | 36.9 | 36.9 | | | | | | Incom-patible | | |
| Cured Solid Coating | | | | | | | | | | | | | | | | | | | | |
| Hardness | F-2H | B | 2H | 2B | 3B | 2B | 2H | H | H | HB | HB | 2B | F | F | HB | B | — | 2B-B | B-HB |
| Flexibility | 2 | 1 | 3 | 1 | 1 | 1 | — | — | — | 4 | 4 | 1 | — | — | 2 | — | — | — | — |

-continued

| EXAMPLE NO. | 178 | 179 | 180 | 181 | 182 | 183 | 184 | 185 | 186 | 187 | 188 | 189 | 190 | 191 | 192 | 193 | 194 | 195 |
|---|---|---|---|---|---|---|---|---|---|---|---|---|---|---|---|---|---|---|
| Coating Composition | | | | | | | | | | | | | | | | | | |
| Monomer 1 Composition | CHA | CHA | CHA | CHA | CHA | CHA | CHA | CHA | CHA | CHA | iBA | DCPOEA | DCPOEA | Cyclol Acrylate | DCPA | DCPA | DCPOEA | DCPA |
| % Wt. | 68.1 | 68.1 | 68.1 | 68.1 | 68.1 | 68.1 | 68.1 | 68.1 | 68.1 | 68.1 | 81.0 | 97.5 | 68.1 | 68.1 | 90.0 | 90.0 | 90.0 | 67.5 |
| Monomer 2 Composition | — | — | — | — | — | — | — | — | — | — | — | — | Phenyl Acrylate | — | — | — | — | DCPOEA |
| % Wt. | — | — | — | — | — | — | — | — | — | — | — | — | — | — | — | — | — | 24.4 |
| Oligomer 1 Composition | 3600 | 3600 | 3600 | 3600 | 3600 | 3600 | 3600 | 3600 | 3600 | 3600 | 3600 | — | 3600 | 3600 | 3600 | 3201 | 3201 | 3600 |
| % Wt. | 29.4 | 29.4 | 29.4 | 29.4 | 29.4 | 29.4 | 29.4 | 29.4 | 29.4 | 29.4 | 16.5 | — | 29.4 | 29.4 | 7.5 | 7.5 | — | 5.6 |
| Oligomer 2 Composition | — | — | — | — | — | — | — | — | — | — | — | — | — | — | — | — | — | — |
| % Wt. | — | — | — | — | — | — | — | — | — | — | — | — | — | — | — | — | — | — |
| Photoinitiator Composition | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Surfactant Composition | 9008 | FC-430 | FC-430 | FC-430 | FC-430 | FC-430 | FC-430 | FC-430 | FC-430 | FC-430 | — | — | — | — | — | — | — | — |
| % Wt. | 4 | 1.0 | 0.5 | 0.001 | 0.005 | 0.012 | 0.053 | 0.11 | 0.53 | 1.0 | — | — | — | — | — | — | — | — |
| Coating Properties | | | | | | | | | | | | | | | | | | |
| Uncured Liquid | | | | | | | | | | | | | | | | | | |
| Viscosity, cP | — | 20.0 | 20.0 | — | — | — | — | — | — | — | — | 20.5 | 20.9 | 30.5 | 29.4 | 25.9 | 27.2 | 26.3 |
| Surface Tension, dyne/cm | — | 25.0 | 31.6 | 35.0 | 34.8 | 33.7 | 32.2 | 29.4 | 27.2 | 25.0 | 23.8 | — | — | — | — | — | — | — |
| Cured Solid Coating | | | | | | | | | | | | | | | | | | |
| Hardness | H | HB-F | HB-F | HB | HB | HB | HB | HB | HB | HB | HB | <3B | HB | 2H | 2H | 2H | <3B | 2H |
| Flexibility | — | — | — | 4 | 4 | 3 | 3 | 3 | 3 | 2-3 | 4 | 1 | 1 | 1 | 1 | 4 | 1 | 3 |
| Adhesion | — | 4 | 4 | 4 | 4 | 3-4 | 3-4 | 3-4 | 3-4 | 3 | 4 | 3 | 3-4 | 2-3 | 4 | 2 | 3 | 3-4 |
| Surface Texture | 3 | 1 | 0 | 3 | 3 | 3 | 3 | 3 | 3 | 3 | 3 | 1 | 2 | 3 | 1 | 1 | 1 | 1 |
| No. of Passes to Cure | 1 | 1-2 | 1-2 | 1-2 | 1-2 | 1-2 | 1-2 | 1-2 | 1-2 | 1-2 | 1-2 | 1 | 2 | 1 | 2 | 2 | 2 | 3 |
| Classification of Monofunctional Monomers (1) | | | | | | | | | | | | | | | | | | |
| Mutually soluble cyclic acrylate | x | x | x | x | x | x | x | x | x | x | x | x | x | x | x | x | x | x |
| ≅ C4 Branched acrylate | | | | | | | | | | | | | | | | | | |
| ≅ C4 Linear acrylate | | | | | | | | | | | | | | | | | | |

| EXAMPLE NO. | 196 | 197 | 198 | 199 | 200 | 201 | 202 | 203 | 204 | 205 | 206 | 207 | 208 | 209 |
|---|---|---|---|---|---|---|---|---|---|---|---|---|---|---|
| Coating Composition | | | | | | | | | | | | | | |
| Monomer 1 Composition | DCPA | DCPOEA | DCPA | DCPA | DCPA | iBA | DCPA | DCPOEA | DCPOEA | DCPOEA | DCPOEA | DCPA | Cyclo Acrylate | iBA |
| % Wt. | 45.0 | 60.0 | 77.9 | 77.9 | 43.8 | 67.2 | 48.7 | 48.7 | 49.7 | 47.7 | 43.2 | 48.8 | 56.1 | 25.4 |
| Monomer 2 Composition | DCPOEA | DCPA | TDA** | TDA** | TDA** | TEDA*** | TEDA*** | TEDA*** | DCPA | DCPA | TDA** | HDODA | TEDA*** | DCPOEA |
| % Wt. | 45.0 | 30.0 | 13.0 | 6.5 | 43.8 | 16.6 | 48.7 | 48.7 | 24.8 | 23.8 | 43.2 | 24.4 | 18.7 | 50.8 |
| Oligomer 1 Composition | 3600 | 3600 | 3600 | 3600 | 3600 | 3600 | — | — | TEDA*** | TDA** | 3600 | 3600 | 3600 | 3600 |
| % Wt. | 7.5 | 7.5 | 6.5 | 6.5 | 9.7 | 13.7 | — | — | 16.6 | 15.9 | 10.8 | 24.4 | 22.4 | 21.2 |
| Oligomer 2 Composition | — | — | — | — | — | — | — | — | 3600 | 3600 | — | — | — | — |
| % Wt. | — | — | — | — | — | — | — | — | 6.2 | 6.0 | — | — | — | — |

-continued

| | 210 | 211 | 212 | 213 | 214 | 215 | 216 | 217 | 218 | 219 | 220 | 221 | 222 |
|---|---|---|---|---|---|---|---|---|---|---|---|---|---|
| Photoinitiator % Wt. | 2.5 | 2.5 | 2.5 | 2.5 | 2.5 | 2.5 | 2.5 | 2.5 | 2.5 | 2.5 | 2.5 | 2.5 | 2.5 |
| Surfactant | — | — | — | — | — | — | — | — | — | — | — | — | — |
| Composition % Wt. | — | — | — | — | — | — | — | — | — | — | — | — | — |
| Coating Properties | | | | | | | | | | | | | |
| Uncured Liquid | | | | | | | | | | | | | |
| Viscosity, cP | — | — | 15.0 | — | — | — | — | 20.9 | 23.6 | — | — | — | — |
| Surface Tension, dyne/cm | — | — | — | — | 15.3 | — | — | — | — | — | — | — | — |
| Cured Solid Coating | | | | | | | | | | | | | |
| Hardness | H | HB-F | 2H | 2H | F-H | 2H | HB | 2H | 2H | 2H | 2H | 2H | 2H |
| Flexibility | 4 | 3-4 | 4 | 3 | 4 | 2 | 1 | 1 | 2 | 2 | 2 | 3 | 4 |
| Adhesion | 1-2 | 1 | 1-2 | 1-2 | 3-4 | 1-2 | 3 | 3 | 2 | 2 | 3 | 1-2 | 4 |
| Surface Texture | 1 | 1 | 3 | 3 | 1 | 3 | 3 | 2 | 2 | 1 | 2 | 2 | 3 |
| No. of Passes to Cure | 2 | 2 | 2 | 2 | 2 | 2 | 3 | 2 | 2 | 3 | 2 | 1 | 2 |
| Classification of Monofunctional Monomers (1) | | | | | | | | | | | | | |
| Mutually soluble cyclic acrylate | x | x | x | x | x | x | x | x | x | x | x | x | x |
| ≅ C₄ Branched acrylate | | | | | | | | | | | | | |
| ≅ C₄ Linear acrylate | | | | | | | | | | | | | |

| EXAMPLE NO. | 210 | 211 | 212 | 213 | 214 | 215 | 216 | 217 | 218 | 219 | 220 | 221 | 222 |
|---|---|---|---|---|---|---|---|---|---|---|---|---|---|
| Coating Compositon | | | | | | | | | | | | | |
| Monomer 1 Composition | PA | iBA | PEA | DCPA | DCPOEA | DCPA | DCPA | DCPA | DCPOEA | DCPOEA | DCPOEA | DCPA | DCPA |
| % Wt. | 53.9 | — | 42.1 | 45.0 | 60.0 | 77.9 | 43.8 | 48.7 | 48.7 | 49.8 | 60.0 | 68.5 | 57.8 |
| Monomer 2 Composition | TEDA*** | TEDA*** | TEDA*** | DCPOEA | DCPA | TDA**, HEA**** | TDA** | TEDA*** | TEDA*** | DCPA, TEDA*** | DCPA | DCPOEA | DCPOEA, TEDA*** |
| % Wt. | 17.6 | — | 37.2 | 45.0 | 30.0 | 6.5, 6.5 | 43.8 | 48.7 | 48.7 | 24.9, 16.6 | 30.0 | 24.4 | 20.6 |
| Oligomer 1 Composition | 3600 | 3600 | 3600 | 3600 | 3600 | 3600 | 3600 | | | 3600 | 3600 | 3600 | 3000 |
| % Wt. | 25.9 | — | 18.2 | 7.5 | 7.5 | 6.5 | 9.7 | | | 6.2 | 7.5 | 4.6 | 13.9 |
| Oligomer 2 Composition | — | — | — | — | — | — | — | — | — | — | — | — | — |
| % Wt. | — | — | — | — | — | — | — | — | — | — | — | — | — |
| Photoinitiator % Wt. | 2.6 | 2.5 | 2.5 | 2.5 | 2.5 | 2.5 | 2.5 | 2.5 | 2.5 | 2.5 | 2.5 | 2.5 | 2.5 |
| Surfactant Composition | — | — | — | FC-430 | FC-430 | FC-430 | FC-430 | FC-430 | FC-430 | FC-430 | FC-430 | FC-430 | FC-430 |
| % Wt. | — | — | — | 1.0 | 1.0 | 1.0 | 1.0 | 1.0 | 1.0 | 1.0 | 1.0 | 1.0 | 1.0 |
| Coating Properties | | | | | | | | | | | | | |
| Uncured Liquid | | | | | | | | | | | | | |
| Viscosity, cP | — | — | — | — | — | — | — | — | — | 22.7 | 24.2 | 15.6 | 14.9 |
| Surface Tension, dyne/cm | — | — | — | — | — | — | — | — | — | — | — | — | — |
| Cured Solid Coating | | | | | | | | | | | | | |
| Hardness | — | F | 2B-B | H-2H | 2H | 2H | — | — | HB | F-H | H | 2H | H |
| Flexibility | 1 | 2 | 1 | 4 | 2 | 4 | — | — | 1 | 2 | 3 | 4 | 4 |
| Adhesion | 3 | 2-3 | 3 | 4 | 3 | 4 | — | — | 1-2 | 4 | 4 | 4 | 4 |
| Surface Texture | 3 | 3 | 1 | 1 | 1 | 1 | — | — | 2 | 0 | 0 | 0 | 0 |
| No. of Passes to Cure | 2 | 2 | 2 | 2 | 2 | 2 | — | — | 2 | 2 | 2 | 2 | 2 |
| Classification of Monofunctional Monomers (1) | | | | | | | | | | | | | |
| Mutually soluble cyclic acrylate | x | x | x | x | x | x | x | x | x | x | x | x | x |
| ≅ C₄ Branched acrylate | | | | | | | | | | | | | |
| ≅ C₄ Linear acrylate | | | | | | | | | | | | | |

-continued

| EXAMPLE NO. | | 223 | 224 | 225 | 226 | 227 | 228 | 229 | 230 | 231 | 232 | 233 | 240 | 241 | 242 |
|---|---|---|---|---|---|---|---|---|---|---|---|---|---|---|---|
| Coating Composition | | | | | | | | | | | | | | | |
| Monomer 1 | Composition | DCPOEA | Cyclol Acrylate | DCPOEA | i-Bornyl Acrylate | Cyclol Acrylate | DCPA | DCPA | DCPOEA | CHMA | CHMA | CHA | TDMA | TDMA | CHMA |
| | % Wt. | 48.8 | 56.1 | 51.5 | 64.9 | 48.2 | 66.5 | 56.0 | 54.2 | 76.9 | 70.8 | 70.8 | 76.9 | 85.6 | 48.1 |
| Monomer 2 | Composition | HDODA | TEDA*** | i-Bornyl Acrylate | TEDA*** | DCPOEA | DCPOEA | DCPOEA, TEDA*** | HDODA | — | — | — | — | — | — |
| | % Wt. | 24.4 | 19.0 | 38.1 | 19.0 | 30.0 | 23.7 | 20.0, 14.8 | 27.0 | — | — | — | — | — | — |
| Oligomer 1 | Composition | 3600 | 3600 | 3600 | 3600 | 3600 | 3600 | 3600 | 3600 | 6700 | 6700 | 6700 | 6700 | 6700 | UV893 |
| | % Wt. | 24.4 | 22.4 | 7.9 | 13.6 | 19.3 | 7.4 | 6.8 | 16.0 | 19.2 | 26.0 | 26.0 | 19.2 | 12.0 | 48.1 |
| Oligomer 2 | Composition | — | — | — | — | — | — | — | — | — | — | — | — | — | — |
| | % Wt. | — | — | — | — | — | — | — | — | — | — | — | — | — | — |
| Photoinitiator | % Wt. | 2.5 | 2.5 | 2.5 | 2.5 | 2.5 | 2.5 | 2.5 | 2.5 | 3.8 | 3.1 | 3.1 | 3.8 | 2.4 | 3.8 |
| Surfactant | Composition | FC-430 | FC-430 | FC-430 | FC-430 | FC-430 | FC-430 | FC-430 | FC-430 | — | — | — | — | — | — |
| | % Wt. | 1.0 | 1.0 | 1.0 | 1.0 | 1.0 | 1.0 | 1.0 | 1.0 | — | — | — | — | — | — |
| Coating Properties | | | | | | | | | | | | | | | |
| Uncured Liquid | | | | | | | | | | | | | | | |
| Viscosity, cP | | 35.3 | 20.0 | 20.8 | 18.2 | 21.3 | 22.9 | 22.9 | 33.7 | 13.4 | 20.8 | 22.2 | 39.9 | 22.4 | 453 |
| Surface Tension, dyne/cm | | — | — | — | — | — | — | — | — | — | — | — | — | — | — |
| Cured Solid Coating | | | | | | | | | | | | | | | |
| Hardness | | 2H | 2H | F | H | H | | | | B | B | <3B | H | H | H |
| Flexibility | | 2 | 2 | 2 | 3 | 3 | | | | | 4 | 0 | 1 | 2-3 | 2 |
| Adhesion | | 2-3 | 1-2 | 4 | 4 | 1-2 | | | | 4 | 4 | | 1 | 1 | 1 |
| Surface Texture | | 0 | 0 | 0 | 0 | 0 | | | | 0 | 1 | 3 | 1 | 2 | 0 |
| No. of Passes to Cure | | 2 | 2 | 2 | 3 | 2 | | | | 5 | 3 | 2 | 4 | 3 | 3 |
| Classification of Monofunctional Monomers (1) | | | | | | | | | | | | | | | |
| Mutually soluble cyclic acrylate | | x | x | x | x | x | x | x | x | x | x | x | | | x |

≙ C₄ Branched acrylate
≙ C₄ Linear acrylate

| EXAMPLE NO. | | 243 | 244 | 245 | 246 | 247 | 248 | 249 | 250 |
|---|---|---|---|---|---|---|---|---|---|
| Coating Composition | | | | | | | | | |
| Monomer 1 | Composition | CHMA | CHMA | CHMA | CHMA | CHMA | CHA | CHA | HDODA |
| | % Wt. | 48.1 | 76.9 | 76.9 | 76.9 | 76.9 | 70.8 | 66.7 | 76.9 |
| Monomer 2 | Composition % Wt. | — | — | — | — | — | — | — | — |
| Oligomer 1 | Composition | UV783 | UV893 | UV783 | 1700 | 7100 | 1700 | UV893 | 6700 |
| | % Wt. | 48.1 | 19.2 | 19.2 | 19.2 | 19.2 | 26.0 | 30.1 | 19.2 |
| Oligomer 2 | Composition % Wt. | — | — | — | — | — | — | — | — |
| Photoinitiator | % Wt. | 3.8 | 3.8 | 3.8 | 3.8 | 3.8 | 3.1 | 3.1 | 3.8 |
| Surfactant | Composition % Wt. | — | — | — | — | — | — | — | — |
| Coating Properties | | | | | | | | | |
| Uncured Liquid | | | | | | | | | |
| Viscosity, cP | | — | 10.9 | — | 14.7 | — | 40.3 | 32.2 | 25.6 |
| Surface Tension, dyne/cm | | — | — | — | — | — | — | — | — |
| Cured Solid Coating | | | | | | | | | |
| Hardness | | Incom- | B | Incom- | HB | Incom- | <3B | <3B | 3H |

-continued

| | | patible | | patible | | patible | |
|---|---|---|---|---|---|---|---|
| Flexibility | | | 3 | | 4 | | 2 | 1 |
| Adhesion | | | 4 | | 4 | | — | 2-3 |
| Surface Texture | | | 3 | | 3 | | 0 | 1 |
| No. of Passes to Cure | | | 2 | | 6 | | 2 | 1 |
| Classification of Monofunctional Monomers (1) | | | | | | | | |
| Mutually soluble cyclic acrylate | x | | x | | x | | x | x |
| ≧ C₄Branched acrylate | | | | | | | | |
| ≧ C₄Linear acrylate | | | | | | | | |

*2-methoxyethyl acrylate
**triethyleneglycol diacrylate
***tetraethyleneglycol diacrylate
****hydroxyethyl acrylate
(1) x denotes compounds having the indicated chemical structure.

Examples 1-26 show in general that diacrylates uniformly give poor adhesion of the film to the substrate. This is shown especially by Examples 1-13, 22 and 23. Examples 14, 16 and 19 in which the monomer was tetrahydrofurfuryl acrylate (THFA), show adhesion values that ranged from poor to excellent. Obviously, THFA is a suitable monomer which may require some formulation changes to make it suitable in all instances. Examples 15, 17 and 18 show the suitability of aromatic acrylates, while Examples 20 and 24-26 show the quite excellent adhesion values obtainable with the nonaromatic cyclic ether acrylates. On the other hand, Example 21, in which 2-methoxyethyl acrylate was the monomer component, illustrates the unsuitability of monomers in which the hydrocarbon chain is too short.

In the second series of examples (27-80), the overall unsuitability of multifunctional acrylates is shown by Examples 31-42, 49 and 52-80, all of which exhibit poor adhesion. On the other hand, Examples 27-30 and 43-48 show that monofunctional glycol acrylates are not suitable because they do not contain a hydrocarbon moiety in the ester group which has four or more carbon atoms.

In the third series of examples (Examples 100-118), Examples 100-111 (also see Example 133) illustrate the unsuitability of di- and tri-functional acrylates because they do not give adequate substrate adhesion. Furthermore, Examples 112-118 illustrate the generally poor performance of either monofunctional acrylates if the linear carbon chains exceed 10 carbons in length. In this regard, it should be noted that Examples 113 and 118 are considered to be experimental anomalies in that ODA does not ordinarily give such favorable properties (see Example 112) and 2EHA ordinarily gives quite satisfactory results (see Examples 131 and 146).

The compositional criteria of the invention are also illustrated by the third group of examples, Examples 119-148 (alkyl acrylates/epoxy oligomers). In particular, Examples 119-126 again confirm the poor adhesion properties when difunctional acrylates are used in the invention. In Examples 127-130, in which acrylates having long ($C_{10}$) carbon chains were used, all of the formulations were incompatible, i.e., no homogeneous solution could be obtained. Example 132 in which a branched $C_{10}$ alkyl acrylate was inoperable, is an anomaly in view of its suitability in other instances (e.g., Examples 116 and 117). Example 134 illustrates the suitability of nonaromatic cyclic acrylates in the invention, while Example 135 illustrates the effectiveness of branched acyclic hydrocarbon acrylates, here $C_8$. The softness of the film in Example 136 appears to be anomalous in view of Example 135. In Examples 137-140, the films in general had good adhesion but all were too soft in the reported formulations. Each of these monomers would, however, be expected to be satisfactory if they were reformulated to somewhat higher viscosities. Examples 141-150 all used $C_4+$ alkyl acrylates, yet only the isobutyl methacrylate (Examples 143 and 148) gave unequivocally satisfactory results for both adhesion and softness in the epoxy oligomer system. Examples 141 and 142 using isooctyl acrylate as the monomer component and Example 147 using ethyl butyl acrylate as the monomer can be used in the invention if formulated to an appropriately higher viscosity to give better hardness. Likewise, the alkyl acrylates of Examples 144-146 will be suitable for use in other oligomer systems.

In Examples 151-230, cyclic alkyl acrylates were used in conjunction with epoxy oligomers. Here, the cyclic acrylates seemed in general to obtain good adhesion throughout, for which reason they are preferred monomers. However, it should be noted that these examples contain both monofunctional and difunctional acrylates. The beneficial effect of the monofunctional monomers may have been masked by the presence of too much multifunctional acrylate therewith. This seems to be the case in Examples 200, 203, 208 and 218. Yet Examples 199 and 226 show that substantial minor amounts of multifunctional acrylates can be used effectively if they do not constitute more than about 20 wt. % of the total coating and the other formulation criteria are met. In other words, a minor amount of multifunctional acrylate monomer can be tolerated in some instances if care is used in the formulation.

In Examples 231-250, cyclic alkyl acrylates were used in conjunction with urethane oligomers. Examples 231-233 illustrate the suitability of the cyclic alkyl acrylates for use in the invention in that all had good hardness and adhesion values. On the other hand, Examples 240, 241 and 250 show once again the unsuitability of difunctional acrylates as a primary component of the composition of the invention. All three exhibited poor substrate adhesion. Examples 242, 243, 245 and 247 were all anomalous. However, it is clear from Examples 244 and 246 that each of the anomalous formulations could be reformulated to be suitable for use in the invention. Examples 248 and 249 are of interest in that the compositions had good adhesion despite the fact the cured formulations were quite soft. Clearly, in these particular compositions, hardness is not as critical as in some of the other formulations.

Exammple 251

A further test was carried out in which an acrylate composition in accordance with U.S. Pat. No. 4,492,718 was prepared having the following composition:

2-Ethylhexyl acrylate 59.2% wt.
Celrad 1700 acrylate methane oligomer 38.4
Darocure 1173 1.6
FC-430 Surfactant 0.8

The coating made therefrom had the following properties:

Uncured Liquid
 Viscosity, cP (25° C.) 57.3
 Surface Tension, dynes/cm 29.8
Cured Solid Coating
 Hardness <3B
 Flexibility 0
 Adhesion 1
 Surface Texture 3
 No. of Passes to Cure 3-4

This composition does not meet the criteria of the present invention in that it did not have sufficient hardness. Thus it did not have good adhesion properties.

| Glossary of Tradenames | | |
|---|---|---|
| Tradename | Product | Source |
| Celrad | Acrylated epoxy, urethane and acrylate oligomers | Celanese Corp. New York, NY |
| Chemlink | Trifunctional acrylate ester oligomer | Sartomer Co. West Chester, PA |
| Darocure | Benzophenone analog | EM Chemicals Hawthorne, NY |
| Endocal | Refrigerated circulating bath | Neslab Instruments Co. Portsmouth, NH |
| Fluorad | Fluorinated | 3M Corporation |

-continued

Glossary of Tradenames

| Tradename | Product | Source |
|---|---|---|
| | acrylate ester oligomer | St. Paul, MN |
| Ganex | Alkylated poly (vinyl pyrrolidone) | GAF Corporation New York, NY |
| Irgacure | α,α-Dimethoxy-α-phenyl-acetophenone | Ciba-Geigy Corp. Ardsley, NY |
| Gardco | Pencil Hardness Gage | Paul N. Gardner Co. Inc. Lauderdale-By-The-Sea. FL |
| Lodyne | Amphoteric fluorochemical surfactant | Ciba-Geigy Corp. Ardsley, NY |
| Parlon S5 | Chlorinated rubber | Hercules Inc. Wilmington. DE |
| UV (Uvithane) | Acrylated urethane oligomers | Thiokol Corp. Danvers, MA |

I claim:

1. An optical recording element on which information can be written and read by means of a focused laser beam comprising a dimensionally stable substrate, a layer of light-absorptive material coated on the substrate, and on optical layer coated on the light-absorptive layer by the sequential steps of:
   1. applying to the substrate a liquid layer of optical coating composition; and
   2. exposing the coated liquid layer to actinic radiation for a time sufficient to effect substantially complete photohardening of acrylic monomer therein, the optical coating composition consisting essentially of a solution of
      a. liquid monofunctional photohardenable acrylic ester monomer having at least 4 carbon atoms but no more than 10 linear carbon atoms and 20 branched carbon atoms in the ester group and having dissolved therein
      b. oligomer having a molecular weight of at least 500 and
      c. 0.05–10% wt. photoinitiator system, the liquid uncured solution having a viscosity of at least 10 cP and surface tension of less than 36 dynes/cm at coating temperature and the solid cured composition having a transmissivity of at least 88% to light having a wavelength of 488–830 nm and a pencil hardness of at least 2B.

2. The optical recording element of claim 1 in which the ester moiety of the monofunctional acrylic ester is a $C_{5-10}$ cyclohydrocarbyl group.

3. The optical recording medium of claim 2 in which the cyclohydrocarbyl group is selected from aryl, alkyl and alkenyl groups.

4. The medium of claim 2 in which the acrylic ester monomer is cyclohexyl acrylate.

5. The medium of claim 1 in which the oligomer is acrylated epoxy resin.

6. The medium of claim 1 which has dissolved therein a nonionic surfactant.

7. The composition of claim 1 in which the surfactant is a fluorinated acrylate ester oligomer.

8. The medium of claim 1 in which the light-absorptive layer is a thin layer of polymeric dye.

9. The medium of claim 8 in which the polymeric dye is supported upon a layer of polymer coated on aluminum.

* * * * *